United States Patent
Nogami et al.

(10) Patent No.: US 8,625,777 B2
(45) Date of Patent: Jan. 7, 2014

(54) PAIRING COMPUTATION DEVICE, PAIRING COMPUTATION METHOD, AND PAIRING COMPUTATION PROGRAM

(75) Inventors: Yasuyuki Nogami, Okayama (JP); Masataka Akane, Okayama (JP); Yumi Sakemi, Okayama (JP); Yoshitaka Morikawa, Okayama (JP)

(73) Assignee: National University Corporation Okayama University, Okayama-shi (JP)

( * ) Notice: Subject to any disclaimer, the term of this patent is extended or adjusted under 35 U.S.C. 154(b) by 329 days.

(21) Appl. No.: 13/060,520

(22) PCT Filed: Aug. 28, 2009

(86) PCT No.: PCT/JP2009/065099
§ 371 (c)(1),
(2), (4) Date: Feb. 24, 2011

(87) PCT Pub. No.: WO2010/024401
PCT Pub. Date: Mar. 4, 2010

(65) Prior Publication Data
US 2011/0179471 A1  Jul. 21, 2011

(30) Foreign Application Priority Data
Aug. 29, 2008 (JP) .................. 2008-222556

(51) Int. Cl.
G06F 7/04 (2006.01)
G06F 15/16 (2006.01)
G06F 17/30 (2006.01)
H04L 29/06 (2006.01)
H04K 3/00 (2006.01)
H04L 9/00 (2006.01)

(52) U.S. Cl.
USPC .................................. 380/1; 726/5

(58) Field of Classification Search
USPC .................................. 380/1; 726/5
See application file for complete search history.

(56) References Cited

U.S. PATENT DOCUMENTS

2005/0094806 A1* 5/2005 Jao et al. ................ 380/30
2006/0029222 A1* 2/2006 Lambert et al. ......... 380/28
(Continued)

FOREIGN PATENT DOCUMENTS

JP    2005 316267    11/2005

OTHER PUBLICATIONS

Kachisa, E. J. et al., "Constructing Brezing-Weng Pairing Friendly Elliptic Curves Using Elements in The Cyclotomic Field", Cryptology Eprint Archive, pp. 1-12, (2007).

(Continued)

Primary Examiner — Kambiz Zand
Assistant Examiner — Benjamin Kaplan
(74) Attorney, Agent, or Firm — Oblon, Spivak, McClelland, Maier & Neustadt, L.L.P.

(57) ABSTRACT

Provided are a pairing computation device, a pairing computation method, and a pairing computation program all of which enable fast pairing computation. The pairing computation device includes, where:

E is an additive group of rational points on a pairable elliptic curve defined over $F_p^k$ with an embedding degree of k, and the curve equation is given by $y^2=x^3+ax+b$ where $a \in F_p$ and $b \in F_p$, E[r] is a set of rational points of a prime order r, $\phi_p$ is Frobenius endomorphism, and the order r and a trace t of the Frobenius endomorphism $\phi_p$ are used as functions of an integer variable $\chi$:

computation means for computing a rational function $f_{\chi,Q}(S)$;

computation means for computing a value of a rational point $S(x_s, y_s)$ on a line passing through a predetermined rational point;

computation means for computing a rational function $f'_{\chi,Q}(S)$ using computation results of these computation means; and computation means for performing pairing computation by using the rational function $f'_{\chi,Q}(S)$ as Formula (1):

$$e(Q,S) = f'_{\chi,Q}(S)^{(p^k-1)/r} \qquad (1).$$

8 Claims, 4 Drawing Sheets

(56) References Cited

U.S. PATENT DOCUMENTS

2008/0226066 A1* 9/2008 Yi et al. .................. 380/47
2008/0226083 A1* 9/2008 Yi et al. .................. 380/282
2009/0136025 A1* 5/2009 Kargl et al. .............. 380/30
2010/0329454 A1* 12/2010 Takashima ................ 380/44
2011/0216899 A1* 9/2011 Nogami et al. ........... 380/28

OTHER PUBLICATIONS

Barreto, P. S. L. M. et al., "Pairing-Friendly Elliptic Curves of Prime Order", Proceedings of SAC 2005, pp. 1-13, (2005).

Sakemi, Y. et al., "An Improvement of Twisted Ate Pairing Using Integer Variable With Small Hamming Weight", the 2008 Symposium on Cryptography and Information Security, pp. 1-6, (Jan. 22-25, 2008).

International Search Report Issued Oct. 6, 2009 in PCT/JP09/065099 filed Aug. 28, 2009.

* cited by examiner

PAIRING COMPUTATION DEVICE, PAIRING COMPUTATION METHOD, AND PAIRING COMPUTATION PROGRAM

TECHNICAL FIELD

The present invention relates to a pairing computation device, a pairing computation method, and a pairing computation program all of which enable fast pairing computation.

BACKGROUND ART

Conventionally, when an individual user uses a variety of services offered over a network such as the Internet, an authentication process is carried out to verify that the individual user is a legitimate user. In such an authentication process, authentication generally uses an ID and a password preset for each individual user. For this purpose, a network is provided with an authentication server for carrying out an authentication process.

Recently, using a digital signature technique, digital signature data unique to an individual user is attached to individual data. This digital signature data ensures that data utilized by an individual user is not tampered by outsiders or is not leaked to outsiders, so that confidential information can be safely handled over a network.

Meanwhile, with a digital signature, an individual user is identified in association with an authentication process at an authentication server, and as a result, history of each individual user is accumulated as information one after another in the authentication server every time an authentication process is performed. Therefore, private information such as which site individual users have accessed and which service they have used is accumulated in the authentication server. Thus, in terms of protection of personal information, great caution is given to prevent leakage of such information.

In order to solve accumulation of history information of individual users caused by the use of digital signatures, it is proposed to use a digital group signature, which is the extended digital signature.

When a digital group signature is used, an individual user transmits, to an authentication server, signature data that certificates that the individual user anonymously belongs to a particular group. The authentication server then verifies that the individual user belongs to a particular group without specifying the individual user from the received signature data. Therefore, while preventing fraud by an individual user who does not belong to a group, the authentication server authenticates an individual user without accumulating history information for each individual user.

For anonymous authentication in such a digital group signature, pairing computation is used.

Pairing computation uses a two-input and one-output function. For example, letting S be a rational point over a prime field $F_p$ and Q be a rational point over a k-degree extension field $F_p^k$, when the two rational points S and Q are input, an element z in the extension field $F_p^{*k}$ is output. Moreover, pairing computation has a bilinear property such that when a times of the rational point S and b times of the rational point Q are input, the ab-th power of z is calculated. This bilinearity is utilized in authentication. Here, "k" is an embedding degree, and "$F_p^{*k}$" is, strictly speaking, expressed as:

$$F_p^{*k} \quad \text{[Formula 1]}$$

in mathematical representation, but is here represented as "$F_p^{*k}$" due to limitations in expression.

In general, for each of the rational points S, Q, a point on an elliptic curve is used. The pairing computation of a rational point on an elliptic curve includes a step of performing computation according to Miller's algorithm and a step of performing exponentiation on the computation result.

With a digital group signature, when access right of an individual user belonging to a group is authenticated, a pairing computation is first performed for excluding an individual user whose access right expires. Then, with the digital group signature, an authentication process is performed through a pairing computation for a predetermined individual user, so that an attribute change such as issue or expiration of access right for each individual user is flexibly handled.

Then, for example, in a case of a digital group signature for a group consisting of 10,000 individual users, if there are 100 individual users whose access rights expire, 100 pairing computations are required. At present, one pairing computation by a general electronic calculator requires about 0.1 second. Accordingly, 100 pairing computations require about 10 seconds. Therefore, in the present situation, a digital group signature scheme is not deemed to be practical and has not been widely used.

In the present situation, in order to put digital group signatures into practical use, researches are focused on improving the speed of pairing computations. For example, a technique for achieving fast pairing computations proposes using Tate pairing computation defined over an elliptic curve to reduce the computation load (see, for example, Patent Document 1).

Patent Document 1: Japanese Patent Application Publication No. 2005-316267

DISCLOSURE OF INVENTION

Problems to be Solved by the Invention

However, the currently proposed techniques for faster pairing computation have not yet been sufficient, and there has been a growing demand for further acceleration of computation.

In view of the present situation, the present inventors have conducted research and development to increase the pairing computation speed and have conceived the present invention.

Means for Solving the Problems

A pairing computation device according to the present invention is for defining pairing e by using:

$$G_1 = E[r] \cap Ker(\phi_p - [1])),$$

and $$G_2 = E[r] \cap Ker(\phi_p - [p]),$$

as a nondegenerate bilinear map:

$$e: G_2 \times G_1 \to F_p^{*k}/(F_p^{*k})^r,$$

where:

E is an additive group of rational points on a pairable elliptic curve defined over $F_p^k$ with an embedding degree of k, and the curve equation is given by $y^2 = x^3 + ax + b$ where $a \in F_p$ and $b \in F_p$, E[r] is a set of rational points of a prime order r, and $\phi_p$ is Frobenius endomorphism, computing pairing $e(Q,S)$ where $S \in G_1$ and $Q \in G_2$, and outputting a result of the computation. The pairing computation device includes, where t is a trace of the Frobenius endomorphism $\phi_p$, instead of computing the pairing e(Q,S) by using a rational function $f_{t-1,Q}(S)$ calculated according to Miller's algorithm as:

$$e(Q,S)=f_{t-1,Q}(S)^{(p^k-1)/r}, \quad \text{[Formula 2]}$$

and the order r and the trace t of the Frobenius endomorphism $\phi_p$ are used as functions of an integer variable $\chi$:

computation means for computing a rational function $f_{\chi,Q}(S)$;

computation means for computing a value of a rational point $S(x_s, y_s)$ on a line passing through a predetermined rational point;

computation means for computing a rational function $f'_{\chi,Q}(S)$ using computation results of these computation means; and computation means for performing pairing computation by using the rational function $f'_{\chi,Q}(S)$ as:

$$e(Q,S)=f'_{\chi,Q}(S)^{(p^k-1)/r}. \quad \text{[Formula 3]}$$

The pairing computation device according to the present invention is characterized in that the computation means for computing the rational function $f_{\chi,Q}(S)$ includes computation means for computing $\chi Q$, storing a result of the computation in a predetermined register, and computing the predetermined rational point by using the result of the computation of $\chi Q$.

Furthermore, the pairing computation device according to the present invention is characterized in that, if the embedding degree k=12, using the integer variable $\chi$, letting the order r and the trace t of the Frobenius endomorphism $\phi_p$ be:

$$r(\chi)=36\chi^4-36\chi^3+18\chi^2-6\chi+1,$$

$$t(\chi)=6\chi^2+1,$$

letting $\chi Q=R$, using a relation of Frobenius endomorphism $\phi_p$ of R being $\phi_p(R)=pR$, rational points $p^{10}\chi Q$, $\chi Q+p^{10}\chi Q$, $p\chi Q+p^3\chi Q$ are computed, a value $l_1$ of the rational point $S(x_s, y_s)$ on a line passing through rational points $(\chi Q, p^{10}\chi Q)$ and a value $l_2$ of the rational point $S(x_s, y_s)$ on a line passing through rational points $(\chi Q+p^{10}\chi Q, p\chi Q+p^3\chi Q)$ are computed, and the rational function $f'_{\chi,Q}(S)$ is computed by using a value $l_3$ of the rational point $S(x_s, y_s)$ on a line passing through rational points $(p\chi Q, p^3\chi Q)$ as:

$$f'_{\chi,Q}(S)=f_{\chi,Q}(S)^{1+p+p^3+p^{10}} \cdot l_1 \cdot l_2 \cdot l_3. \quad \text{[Formula 4]}$$

Moreover, the pairing computation device according to the present invention is characterized in that using Frobenius endomorphism $\phi_p$ of the rational function $f_{\chi,Q}(S)$ being $\phi_p(f_{\chi,Q}(S))=f_{\chi,Q}(S)^p$, $$f_{\chi,Q}(S)^{1+p^{10}} \cdot l_1 \quad \text{[Formula 5]}$$

is computed, and using Frobenius endomorphism $\phi_p$ of a value l of the rational point $S(x_s, y_s)$ on a line passing through rational points $(Q_1, Q_2)$, $Q_1, Q_2 \in G_2$, being a value of the rational point $S(x_s, y_s)$ on a line passing through rational points $(pQ_1, pQ_2)$, the rational function $f'_{\chi,Q}(S)$ is computed by computing:

$$f_{\chi,Q}(S)^{p+p^3} \cdot l_3 \quad \text{[Formula 7]}$$

which satisfies:

$$f_{\chi,Q}(S)^{p+p^3} \cdot l_3 = \phi_p^3(f_{\chi,Q}(S)^{1+p^{10}} \cdot l_1). \quad \text{[Formula 6]}$$

A pairing computation method according to the present invention is for defining pairing e by using:

$$G_1=E[r]\cap Ker(\phi_p-[1]),$$

and $$G_2=E[r]\cap Ker(\phi_p-[p]),$$

as a nondegenerate bilinear map:

$$e: G_2 \times G_1 \to F^*_{p^k}/(F^*_{p^k})^r,$$

where:

E is an additive group of rational points on a pairable elliptic curve defined over $F_p^k$ with an embedding degree of k, and the curve equation is given by $y^2=x^3+ax+b$ where $a \in F_p$ and $b \in F_p$, E[r] is a set of rational points of a prime order r, and $\phi_p$ is Frobenius endomorphism, and computing pairing e(Q,S) where $S \in G_1$ and $Q \in G_2$ by an electronic calculator including a CPU. The pairing computation method includes steps of, where t is a trace of the Frobenius endomorphism $\phi_p$, instead of computing the pairing e(Q, S) by using a rational function $f_{t-1,Q}(S)$ calculated according to Miller's algorithm as:

$$e(Q,S)=f_{t-1,Q}(S)^{(p^k-1)/r}, \quad \text{[Formula 2]}$$

and the order r and the trace t of the Frobenius endomorphism $\phi_p$ are used as functions of an integer variable $\chi$:

causing the CPU of the electronic calculator to function as computation means for computing a rational function $f_{\chi,Q}(S)$;

causing the CPU of the electronic calculator to function as computation means for computing a value of a rational point $S(x_s, y_s)$ on a line passing through a predetermined rational point;

causing the CPU of the electronic calculator to function as computation means for computing a rational function $f'_{\chi,Q}(S)$ using results of the computations; and causing the CPU of the electronic calculator to function as computation means for performing computation by using the rational function $f'_{\chi,Q}(S)$ as:

$$e(Q,S)=f'_{\chi,Q}(S)^{(p^k-1)/r} \quad \text{[Formula 3]}$$

The pairing computation method according to the present invention is characterized by further including a step of causing the CPU of the electronic calculator to function as computation means for computing $\chi Q$ and computing the predetermined rational point by using the result of the computation of $\chi Q$, after the step of computing the rational function $f_{\chi,Q}(S)$.

A pairing computation program according to the present invention is for defining pairing e by using:

$$G_1=E[r]\cap Ker(\phi_p-[1]),$$

and $$G_2=E[r]\cap Ker(\phi_p-[p]),$$

as a nondegenerate bilinear map:

$$e: G_2 \times G_1 \to F^*_{p^k}/(F^*_{p^k})^r,$$

where:

E is an additive group of rational points on a pairable elliptic curve defined over $F_p^k$ with an embedding degree of k, and the curve equation is given by $y^2=x^3+ax+b$ where $a \in F_p$ and $b \in F_p$, E[r] is a set of rational points of a prime order r, and $\phi_p$ is Frobenius endomorphism, and causing an electronic calculator including a CPU to compute pairing e(Q,S) where $S \in G_1$ and $Q \in G_2$. The pairing computation program causes the electronic calculator to function as, where t is a trace of the Frobenius endomorphism $\phi_p$, instead of causing computation of the pairing e(Q,S) by using a rational function $f_{t-1,Q}(S)$ calculated according to Miller's algorithm as:

$$e(Q,S)=f_{t-1,Q}(S)^{(p^k-1)/r}, \quad \text{[Formula 2]}$$

and the order r and the trace t of the Frobenius endomorphism $\phi_p$ are used as functions of an integer variable $\chi$:

computation means for computing a rational function $f_{\chi,Q}(S)$;

computation means for computing a value of a rational point $S(x_s, y_s)$ on a line passing through a predetermined rational point;

computation means for computing a rational function $f'_{\chi,Q}(S)$ using results of the computations; and computation means for performing computation by using the rational function $f'_{\chi,Q}(S)$ as:

$$e(Q,S)=f'_{\chi,Q}(S)^{(p^k-1)/r}. \quad \text{[Formula 3]}$$

The pairing computation program according to the present invention is characterized in that the program causes the electronic calculator to function as computation means for computing $\chi Q$ and computation means for computing the predetermined rational point by using the result of the computation of $\chi Q$.

EFFECTS OF THE INVENTION

In accordance with the present invention, a rational function calculated according to Miller's algorithm in pairing computation is given as a function of an integer variable $\chi$, so that the rational function can be calculated at high speed, thereby achieving faster pairing computation. Therefore, it is possible to provide digital group signature service of practical use.

DESCRIPTION OF THE REFERENCE SIGNS

Figure 1:
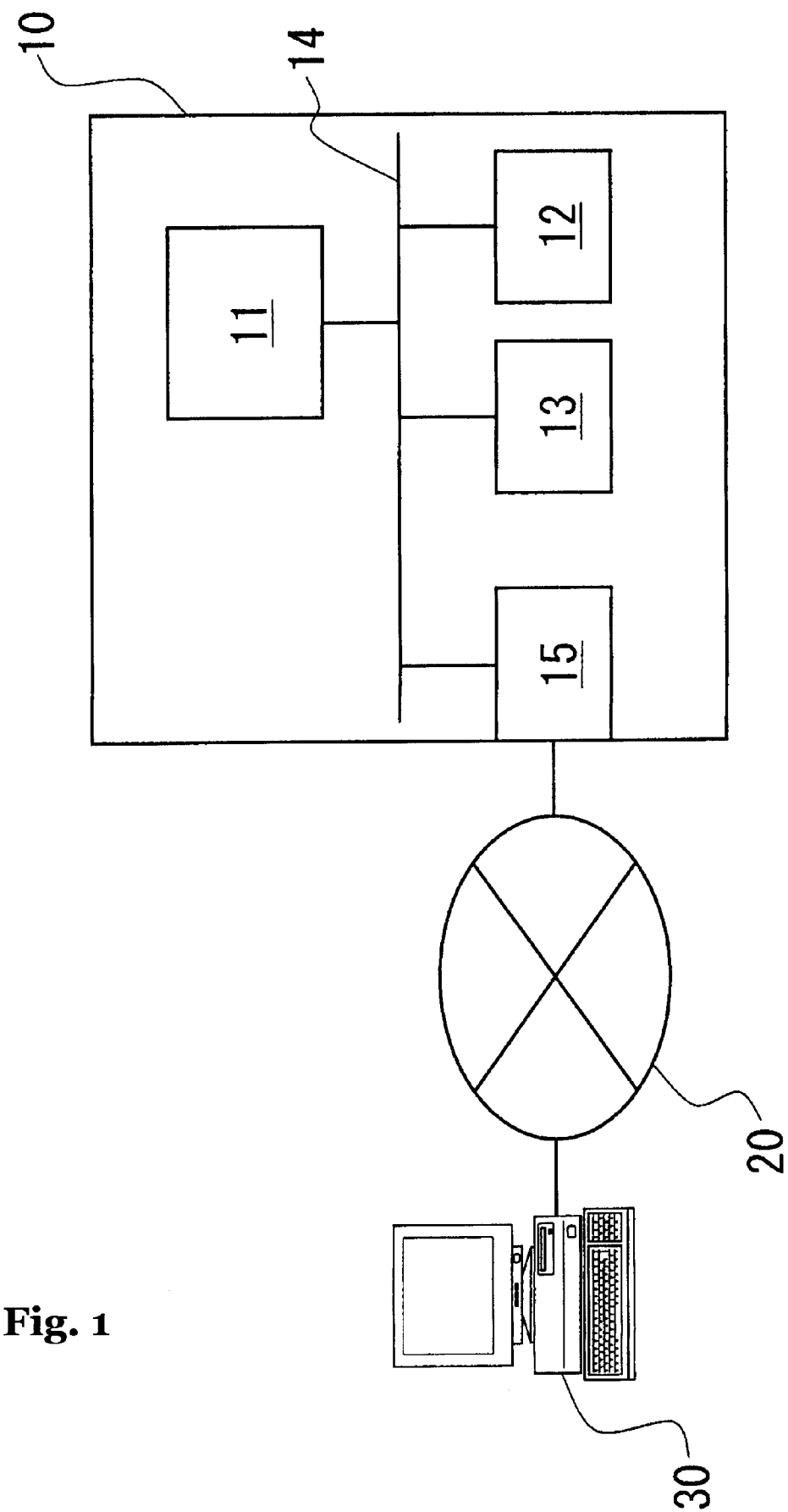
FIG. 1 is a schematic diagram of a pairing computation device according to an embodiment of the present invention.

| 10 | electronic calculator |
| 11 | CPU |
| 12 | storage device |
| 13 | memory device |
| 14 | bus |
| 15 | input/output control unit |
| 20 | electrical communication line |
| 30 | client device |

BEST MODE(S) FOR CARRYING OUT THE INVENTION

A pairing computation device, a pairing computation method, and a pairing computation program according to the present invention perform pairing computation including a first step of computing a rational function according to Miller's algorithm and a second step of performing exponentiation on the computation result. In the first step, the pairing computation device, the pairing computation method, and the pairing computation program compute a rational function using an integer variable $\chi$ to speed up the computation.

Specifically, in the conventional pairing computation, pairing e is defined by using:

$$G_1=E[r]\cap Ker(\phi_p-[1]),$$

and $$G_2=E[r]\cap Ker(\phi_p-[p]),$$

as a nondegenerate bilinear map:

$$e:G_2\times G_1\to F_{p^k}^*/(F_{p^k}^*)^r,$$

where:

E is an additive group of rational points on a pairable elliptic curve defined over $F_{p^k}$ with an embedding degree of k, and the curve equation is given by $y^2=x^3+ax+b$ where $a\in F_p$ and $b\in F_p$, E[r] is a set of rational points of a prime order r, and $\phi_p$ is Frobenius endomorphism, and pairing $e(Q,S)$ is computed where $S\in G_1$ and $Q\in G_2$, and t is a trace of the Frobenius endomorphism $\phi_p$, by using a rational function $f_{t-1,Q}(S)$ calculated according to Miller's algorithm by the following formula known as Ate pairing:

$$e(Q,S)=f_{t-1,Q}(S)^{(p^k-1)/r}. \quad \text{[Formula 2]}$$

By contrast, the present inventors have found pairing that allows for faster computation by using an integer variable $\chi$ on an elliptic curve. This pairing is referred to as "Xate pairing."

In other words, the pairing computation device, the pairing computation method, and the pairing computation program according to the present invention use Xate pairing rather than Ate pairing, thereby enabling fast computation.

In particular, the elliptic curves used in pairing computation are known as pairing-friendly curves corresponding to the respective embedding degrees. For example, with an embedding degree k=12, the order r and the trace t of the Frobenius endomorphism $\phi_p$ are known to be represented as follows using the integer variable $\chi$:

$$r(\chi)=36\chi^4-36\chi^3+18\chi^2-6\chi+1,$$

$$t(\chi)=6\chi^2+1.$$

With an embedding degree k=10, r and t are known to be represented as follows:

$$r(\chi)=25\chi^4+25\chi^3+15\chi^2+5\chi+1,$$

$$t(\chi)=10\chi^2+5\chi+3.$$

Alternatively, they are also known to be represented as follows:

$$r(\chi)=\chi^8-1,$$

$$t(\chi)=-\chi^6+\chi^4-\chi^2+2.$$

With an embedding degree k=8, r and t are known to be represented as follows:

$$r(\chi)=9\chi^4+12\chi^3+8\chi^2+4\chi+1,$$

$$t(\chi)=-9\chi^3-3\chi^2-2\chi.$$

Alternatively, they are also known to be represented as follows:

$$r(\chi)=\chi^4-8\chi^2+25,$$

$$t(\chi)=(2\chi^3-11\chi+15)/15.$$

Alternatively, they are also known to be represented as follows:

$$r(\chi)=\chi^8-\chi^4+1,$$

$$t(\chi)=\chi^5-\chi+1.$$

With an embedding degree k=18, r and t are known to be represented as follows:

$$r(\chi)=(\chi^6+37\chi^3+343)/343,$$

$$t(\chi)=(\chi^4+16\chi+7)/7.$$

In the following, Xate pairing will be described with the embedding degree k=12, by way of example.

With the embedding degree k=12, pairing e is defined by using:

$$G_1=E[r]\cap Ker(\phi_p-[1]),$$

and $$G_2=E[r]\cap Ker(\phi_p-[p]),$$

as a nondegenerate bilinear map:

$$e: G_2 \times G_1 \to F^*_{p^{12}}/(F^*_{p^{12}})^r$$

where:

E is an additive group of rational points on a pairable elliptic curve defined over $F_{p^{12}}$, and the curve equation is given by $y^2=x^3+b$ where $b \in F_p$, E[r] is a set of rational points of a prime order r, and $\phi_p$ is Frobenius endomorphism.

In this case, the order r and the trace t of the Frobenius Endomorphism $\phi_p$ can be represented as follows using the integer variable $\chi$ as described above.

$$r(\chi)=36\chi^4-36\chi^3+18\chi^2-6\chi+1 \quad \text{(Equation 1)}$$

$$t(\chi)=6\chi^2+1 \quad \text{(Equation 2)}$$

Equation 2 can be transformed as follows. Here, the notation ($\chi$) will be omitted unless particularly necessary, for the sake of convenience.

$$6\chi^2 \equiv t-1 \equiv p \pmod{r} \quad \text{(Equation 3)}$$

Here, a characteristic p has the following relational expression.

$$p=r+t-1 \quad \text{(Equation 4)}$$

Therefore, the characteristic p is represented as follows using the integer variable $\chi$.

$$p(\chi)=36\chi^4-36\chi^3+24\chi^2-6\chi+1 \quad \text{(Equation 5)}$$

Using Equation 3, Equation 5 can be transformed as follows.

$$p \equiv p^2-6\chi(p+1)+4p+1 \pmod{r} \quad \text{(Equation 6)}$$

Equation 6 can be transformed as follows.

$$6\chi(1+p) \equiv p^2+3p+1 \pmod{r} \quad \text{(Equation 7)}$$

Here, based on the already-known relational expression $p^4-p^2+1 \equiv 0 \pmod{r}$, the following equation is obtained.

$$p^2(1-p)(1+p) \equiv 1 \pmod{r} \quad \text{(Equation 8)}$$

Equation 8 can be transformed as follows.

$$(1+p)^{-1} \equiv p^2(1-p) \pmod{r} \quad \text{(Equation 9)}$$

Using Equasion 9 and from the relational expression $p^6 \equiv -1 \pmod{r}$, Equation 7 can be transformed as follows.

$$6\chi \equiv (1+p)^{-1}\{(1+p)^2+p\} \quad \text{(Equation 10)}$$
$$\equiv 1+p+p^3+p^{10} \pmod{r}$$

Next, a rational function $f_{t-1,Q}(\cdot)$ of Ate pairing will be considered. In particular, with Equation 3, the rational function $f_{t-1,Q}(\ )$ can be represented as follows, where t-1=T:

[Formula 8]

$$f_{6\chi^2,Q}=fT,Q \quad \text{(Equation 11)}.$$

Here, $Q \in G_2$, and for $\forall S \in G_1$, the following equation is given:

[Formula 9]

$$f_{6\chi^2,Q}(S)^{(p^{12}-1)/r}=f_{T,Q}(S)^{(p^{12}-1)/r}=\alpha(Q,S) \quad \text{(Equation 12)}.$$

Using Equation 10, the following equation is obtained:

[Formula 10]

$$f_{6\chi^2,Q}=f_{6\chi\cdot\chi,Q}=f_{(1+p+p^3+p^{10})\chi,Q} \quad \text{(Equation 13)}.$$

Here, it is supposed that the rational function satisfies the following relational expressions:

[Formula 11]

$$f_{a+b,Q}=f_{a,Q}\cdot f_{b,Q}\cdot g_{aQ,bQ} \quad \text{(Equation 14)},$$

[Formula 12]

$$f_{ab,Q}=f_{b,Q}{}^a\cdot f_{a,bQ}=f_{a,Q}{}^b f_{b,aQ} \quad \text{(Equation 15)},$$

and

[Formula 13]

$$f_{p^j,Q}=f_{p,Q}{}^{ip^{j-1}} \quad \text{(Equation 16)}.$$

Therefore, Equation 13 can be transformed as follows:

[Formula 14]

$$f_{(1+p+p^3+p^{10})\chi,Q}=f_{\chi,Q}\cdot f_{\chi,Q}{}^p\cdot g_{\chi Q,p\chi Q}\cdot$$
$$f_{\chi,Q}{}^{p^3}\cdot g_{p^3\chi Q,\#}{}^{10}{}_Q g_{\chi Q+p\chi Q,p^3\chi Q+p^{10}\chi Q}\cdot$$
$$f_{p\cdot\chi,Q}{}^{1+3p^2+10p^9} \quad \text{(Equation 17)}.$$

Here, $g_{aQ,bQ}=l_{aQ,bQ}/v_{aQ+bQ}$ where $l_{aQ,bQ}$ denotes a value on the line passing through two rational points aQ and bQ, and $v_{aQ+bQ}$ denotes a value on the vertical line of rational point aQ+bQ. When the embedding degree is an even number, the computation of $V_{aQ+bQ}$ can be omitted.

Furthermore, in Equation 17,

[Formula 15]

$$f_{p\cdot\chi,Q}{}^{1+3p^2+10p^9} \quad \text{(Equation 18)}$$

has bilinearity and can be transformed as follows:

[Formula 16]

$$f_{p,Q}{}^{\chi(1+3p^2+10p^9)} \quad \text{(Equation 19)}.$$

Therefore, using Equation 3, Equation 13, and Equation 19, the transformation of Equation 17 results in the following.

[Formula 17]

$$f_{p,Q}\cdot\{f_{p,Q}{}^{\chi(1+3p^2+10p^9)}\}^{-1}=f_{\chi,Q}\cdot f_{\chi,Q}{}^p\cdot g_{\chi Q,p\chi Q}\cdot$$
$$f_{\chi,Q}{}^{p^3}\cdot f_{\chi,Q}{}^{p^{10}}\cdot g_{p^3\chi Q,p^{10}\chi Q}\cdot g_{\chi Q+p\chi Q,p^3\chi Q+p^{10}\chi Q} \quad \text{(Equation 20)}.$$

Here, given that the left side of Equasion 20 has bilinearity, the present inventors have noticed that the right side of Equasion 20 has also bilinearity and set the right side of Equasion 20 as a new rational function $f'_{\chi,Q}(\cdot)$.

More specifically, the computation of pairing $e(Q,S)$ is carried out by the following equation:

$$e(Q,S) = f'_{\chi,Q}(S)^{(p^{12}-1)/r}. \quad \text{[Formula 18]}$$

The present inventors call this pairing $e(Q,S)$ as Xate pairing.

Furthermore, the right side of Equasion 20 can be transformed as follows:

[Formula 19]

$$f_{\chi,Q}^{1+p+p^3+p^{10}} \cdot g_{\chi Q, p^{10}\chi Q} \cdot g_{p\chi Q, p^3 \chi Q} \cdot g_{\chi Q+p^{10}\chi Q, p\chi Q+p^3\chi Q} \quad \text{(Equasion 21)}.$$

In other words, in the case of the embedding degree k=12, if a value $l_1$ of a rational point $S(x_s, y_s)$ on a line passing through rational points $(\chi Q, p^{10}\chi Q)$, a value $l_2$ of a rational point $S(x_s, y_s)$ on a line passing through rational points $(\chi Q + p^{10}\chi Q, p\chi Q + p^3 \chi Q)$, and a value $l_3$ of a rational point $S(x_s, y_s)$ on a line passing through rational points $(p\chi Q, p^3 \chi Q)$ are calculated and specified, the computation according to Miller's algorithm can be speeded up based on the following equation:

$$f'_{\chi,Q}(S) = f_{\chi,Q}(S)^{1+p+p^3+p^{10}} \cdot l_1 \cdot l_2 \cdot l_3. \quad \text{[Formula 4]}$$

Moreover, the right side of Equasion 20 can be transformed as follows, which makes the computation of $f'_{\chi,Q}(S)$ even faster:

[Formula 20]

$$\{f_{\chi,Q}^{1+p^{10}} \cdot g_{\chi Q, p^{10}\chi Q}\}^{1+p^3} \cdot g_{\chi Q+p^{10}\chi Q, p\chi Q+p^3 \chi Q} \quad \text{(Equasion 22)}.$$

As described above, if pairing computation is carried out using Xate pairing, the computation can be performed using the rational function $f_{\chi,Q}(S)$ and a new rational function $f'_{\chi,Q}(S)$ obtained by using the values on the lines passing through predetermined rational points. In particular, the rational function $f'_{\chi,Q}(S)$ can be computed using $\chi$ having a size smaller than $t-1$, thereby achieving faster pairing computation.

The description has been given so far to the case of the embedding degree k=12. This is basically applicable to the cases of the embedding degrees k=8, 10, 18, and therefore, a detailed description thereof will not be repeated.

In the following, an embodiment with embedding degree k=12 will be detailed. It is noted that the present embodiment is intended for digital group signatures, and an authentication server configured with a predetermined electronic calculator is assumed as the pairing computation device. However, the pairing computation device may not be configured as an authentication server and may be any device as long as it includes at least computing means such as CPU and can perform pairing computation.

Figure 4:
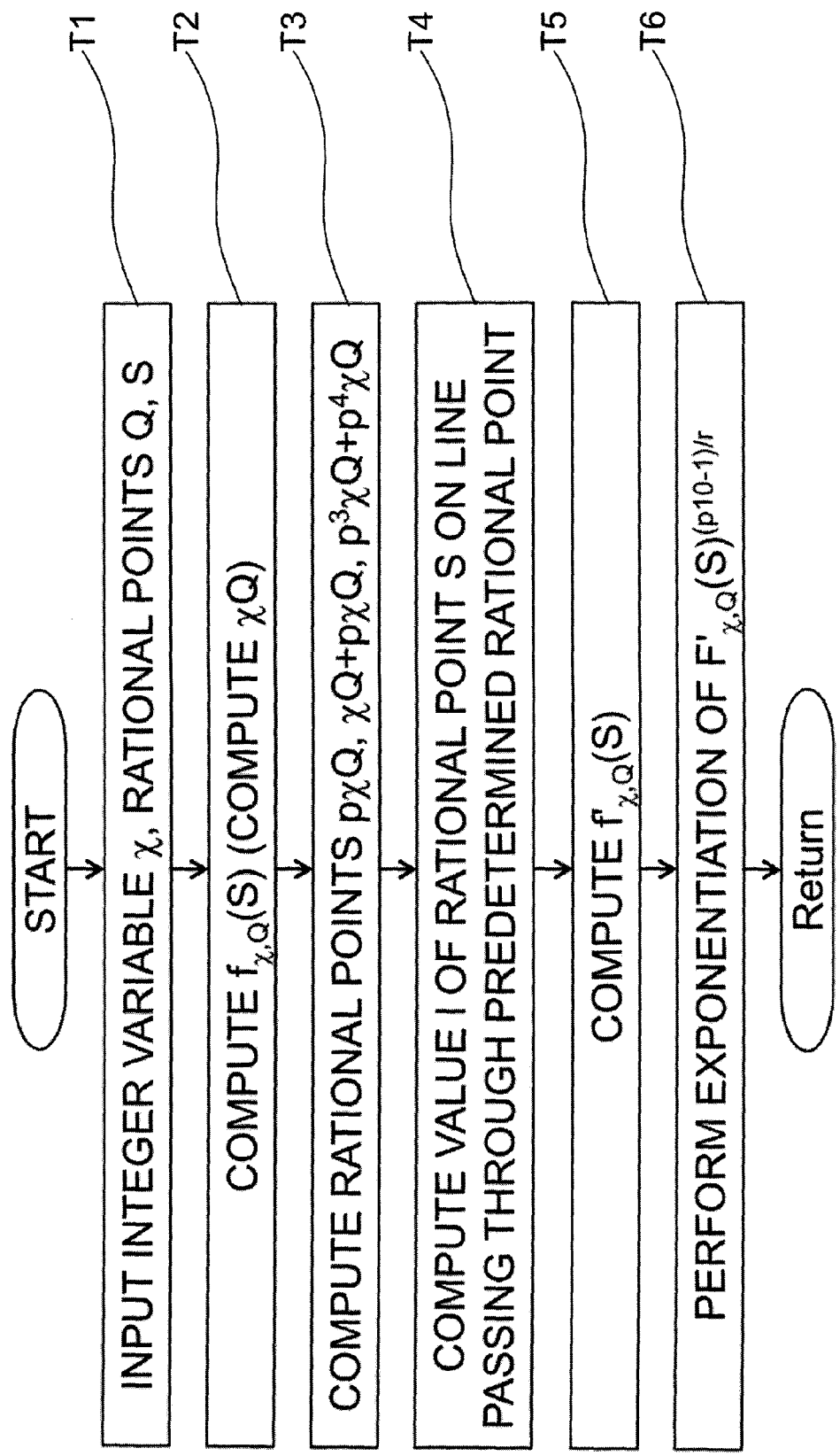
FIG. 4 is a flowchart of a pairing computation program according to another embodiment of the present invention.

As shown in FIG. 1, an electronic calculator 10 which configures an authentication server includes a CPU 11 for performing computation, a storage device 12 such as a hard disk for storing a variety of programs such as a pairing computation program and data for use in the pairing computation program, and a memory device 13 configured with a RAM, for example, for expanding the pairing computation program so as to be executable and for temporarily storing data generated by execution of the pairing computation program. FIG. 4 also shows a bus 14.

The electronic calculator 10 is also connected to an electrical communication line 20 such as the Internet so as to be able to receive signature data of a digital group signature transmitted from a client device 30 connected to the electrical communication line 20. FIG. 1 shows that the electronic calculator 10 includes an input/output control unit 15.

When signature data of a digital group signature is transmitted from the client device 30 to the electronic calculator 10, the transmitted signature data is temporarily stored in the memory device 13. Then, the electronic calculator 10 performs pairing computation by executing the pairing computation program.

Figure 2:
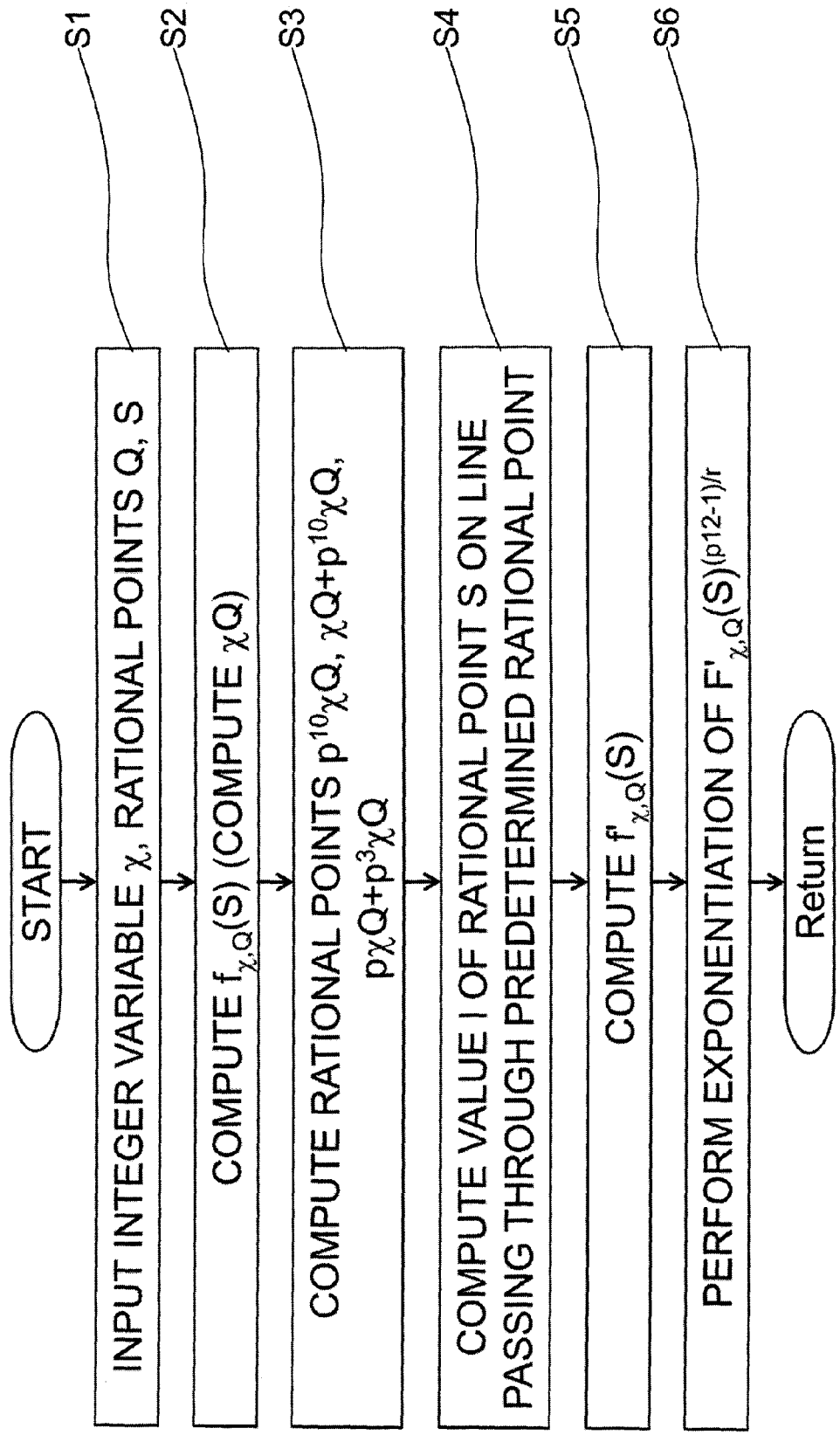
FIG. 2 is a flowchart of a pairing computation program according to the embodiment of the present invention.

More specifically, upon execution of the pairing computation program, the electronic calculator 10 performs pairing computation based on a flowchart shown in FIG. 2 to implement a digital group signature. It is noted that the authentication process in the digital group signature will not be detailed, and only the pairing computation as a subroutine in the authentication process will be detailed.

With the pairing computation program, the CPU 11 of the electronic calculator 10 functions as input means for inputting required data in step S1 as shown in FIG. 2. More specifically, in the electronic calculator 10, data of an integer variable $\chi$ and data of a rational point Q stored beforehand in the memory device 13 are input in a predetermined register provided inside the CPU 11, and in addition, data of a rational point S temporarily stored as signature data in the memory device 13 is input in a predetermined register provided inside the CPU 11.

Then, with the pairing computation program, the CPU 11 of the electronic calculator 10 functions as first computation means for performing computation of a rational function $f_{\chi,Q}(S)$ by Miller's algorithm, in step S2.

Figure 3:
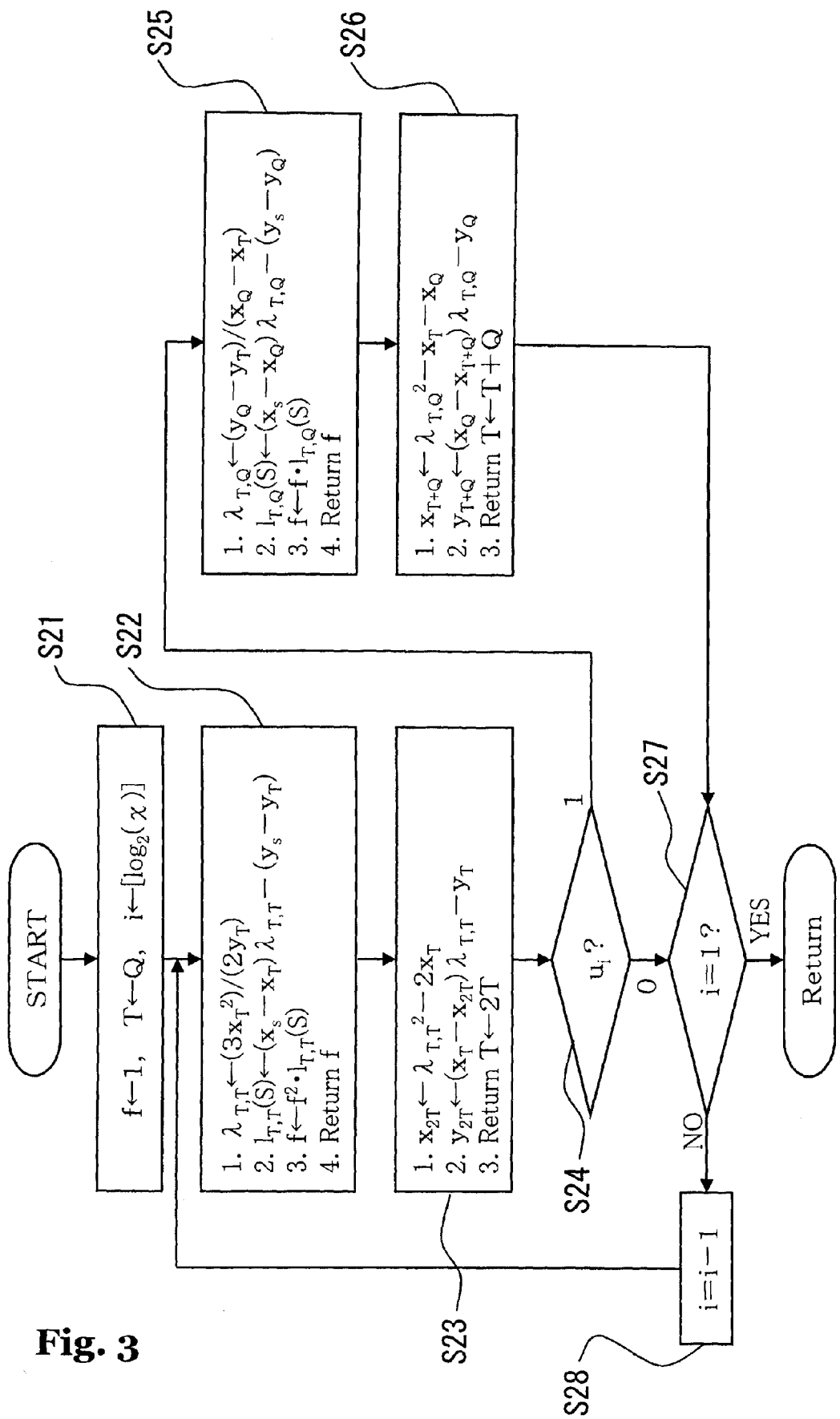
FIG. 3 is a flowchart for computing a rational function $f_{\chi,Q}(S)$.

Specifically, the computation of the rational function $f_{\chi,Q}(S)$ is executed as shown in a flowchart in FIG. 3. In particular, in step S2, the computation of $\chi Q$ is performed along with the computation of the rational function $f_{\chi,Q}(S)$, and the result of the computation of $\chi Q$ is stored in a predetermined register provided inside the CPU 11.

More specifically, based on the flowchart in FIG. 3, the electronic calculator 10 performs initial settings in step S21. More specifically, the electronic calculator 10 performs an operation to set $f \leftarrow 1$, $T \leftarrow Q$, and $i \leftarrow [\log_2(\chi)]$, where i is the number of bits if the integer variable $\chi$ is in binary representation.

Then, based on the flowchart in FIG. 3, the electronic calculator 10 performs a predetermined computation for the rational function $f_{\chi,Q}(S)$ part, in step S22.

Then, based on the flowchart in FIG. 3, the electronic calculator 10 performs a predetermined computation for the $\chi Q$ part, in step S23.

Then, based on the flowchart in FIG. 3, the electronic calculator 10 determines whether value $u_i$ of the i-th bit of the integer variable $\chi$ is "1" or "0", in step S24.

If $u_i=1$, based on the flowchart in FIG. 3, the electronic calculator 10 performs a predetermined computation for the rational function $f_{\chi,Q}(S)$ part, in step S25, and then performs a predetermined computation for the $\chi Q$ part, in step S26.

Then, based on the flowchart in FIG. 3, the electronic calculator 10 performs a termination determination, in step S27.

If $i \neq 1$ in step S27, based on the flowchart in FIG. 3, the electronic calculator 10 decrements i in step S28, and then, returning to step S22, repeatedly performs the computations of the rational functions $f_{\chi,Q}(S)$ and $\chi Q$ until i=1 in step S27.

If i=1 in step S27, the electronic calculator 10 stores the computation result of the rational function $f_{\chi,Q}(S)$ and the computation result of $\chi Q$ in predetermined registers and then ends the subroutine based on the flowchart in FIG. 3.

Then, with the pairing computation program, the CPU 11 of the electronic calculator 10 functions as second computation means for computing rational points $p^{10}\chi Q$, $\chi Q+p^{10}\chi Q$, $p\chi Q+p^3\chi Q$, in step S3.

In particular, in the second computation means, letting $\chi Q$ stored in the predetermined register in step S2=R, using the relation of Frobenius endomorphism $\phi_p$ of R being $\phi_p(R)=pR$, computation is performed by assuming that the rational points are $p^{10}\chi Q = p^{10}R$, $\chi Q + p^{10}\chi Q = R + p^{10}R$, $p\chi Q + p^3\chi Q = pR + p^3R$.

Specifically, given $T = \chi Q = R$ where $X = p^{10}R$, $Y = R + p^{10}R$, $Z = pR + p^3R$, the electronic calculator 10 performs computation as follows:

$$X \leftarrow \phi_p^{10}(T),$$

$$Y \leftarrow T + X,$$

and $$Z \leftarrow \phi_p^3(Y).$$

Therefore, since the electronic calculator 10 can perform computation without performing a multiplication process in step S3, the computation can be speeded up.

Then, with the pairing computation program, the CPU 11 of the electronic calculator 10 functions as third computation means for computing the value $l_1$ of the rational point $S(x_s, y_s)$ on the line passing through the rational points $(\chi Q, p^{10}\chi Q)$ and the value $l_2$ of the rational point $S(x_s, y_s)$ on the line passing through the rational points $(\chi Q+p^{10}\chi Q, p\chi Q+p^3\chi Q)$, in step S4.

Specifically, in the electronic calculator 10, $l_1 = l_{T,X}(S)$ is computed as follows:

$$\lambda_{T,X} \leftarrow (y_X - y_T)/(x_X - x_T), \text{ and}$$

$$l_{T,X}(S) \leftarrow (x_S - x_X)\lambda_{T,X} - (y_S - y_X).$$

Furthermore, in the electronic calculator 10, $l_2 = l_{Y,Z}(S)$ is computed as follows:

$$\lambda_{Y,Z} \leftarrow (y_Z - y_Y)/(x_Z - x_Y),$$

and $$l_{Y,Z}(S) \leftarrow (x_S - x_Z)\lambda_{Y,Z} - (y_S - y_Z).$$

Then, with the pairing computation program, the CPU 11 of the electronic calculator 10 functions as fourth computation means for computing, using the computation result in the first computation means, the computation result in the third computation means, and the value $l_3$ of the rational point $S(x_s, y_s)$ on the line passing through the rational points $(p\chi Q, p^3\chi Q)$, a rational function $f'_{\chi,Q}(S)$ as follows, in step S5:

$$f' = _{\chi,Q}(S) = f_{\chi,Q}(S)^{l+p^3+p^{10}} \cdot l_1 \cdot l_2 \cdot l_3. \quad \text{[Formula 4]}$$

In particular, in this case, given that Frobenius endomorphism $\phi_p$ of the rational function $f_{\chi,Q}(S)$ is $\chi_p(f_{\chi,Q}(S)) = f_{\chi,Q}(S)^p$, using $\phi_p^{10}(f_{\chi,Q}(S)) = f_{\chi,Q}(S)^{p^{10}}$ (here, $p^{10}$ represents $p^{10}$), the electronic calculator 10 computes:

$$f_{\chi,Q}(S)^{l+p^{10}} \cdot l_1. \quad \text{[Formula 5]}$$

Furthermore, using Frobenius endomorphism $\phi_p$ of a value l of a rational point $S(x_s, y_s)$ on a line passing through rational points $(Q_1, Q_2)$, $Q_1, Q_2 \in G_2$, being a value of a rational point $S(x_s, y_s)$ on a line passing through rational points $(pQ_1, pQ_2)$, the electronic calculator 10 computes a rational function $f_{\chi,Q}(S)$ by computing:

$$f_{\chi,Q}(S)^{p+p^3} \cdot l_3 \quad \text{[Formula 6]}$$

which satisfies:

$$f_{\chi,Q}(S)^{p+p^3} \cdot l_3 = \phi_p^3(f_{\chi,Q}(S)^{l+p^{10}} \cdot l_1). \quad \text{[Formula 6]}$$

Specifically, the electronic calculator 10 performs computation as follows. Here, $p^{\hat{}}3$ represents $p^3$.
1. $C \leftarrow f^{p^{\hat{}}10}$
2. $C \leftarrow C \cdot f$
3. $A \leftarrow C \cdot l_{T,X}(S)$
4. $B \leftarrow A^{p^{\hat{}}3}$
5. return A, B Therefore, $$f'_{\chi,Q}(S) = f_{\chi,Q}(S)^{l+p^3+p^{10}} \cdot l_1 \cdot l_2 \cdot l_3 \quad \text{[Formula 4]}$$

can be calculated as:

$$f' \leftarrow A \cdot B \cdot l_{Y,Z}(S).$$

In this manner, the use of Xate pairing can significantly reduce the computation amount thereby achieving faster pairing computation.

Then, with the pairing computation program, the CPU 11 of the electronic calculator 10 functions as fifth computation means for performing final exponentiation in the pairing $e(Q, S)$ in step S6.

Specifically, the electronic calculator 10 performs computation as follows.
1. $f' \leftarrow f^{p^{\hat{}}6} \cdot f^{-1}$
2. $f' \leftarrow f^{p^{\hat{}}2} \cdot f$
3. $a \leftarrow (f^6)^{\chi} \cdot (f^5)^{p^{\hat{}}6}$
4. $b \leftarrow a^p$
5. $b \leftarrow a \cdot b$
6. compute $f^p, f^{p^{\hat{}}2}$, and $f^{p^{\hat{}}3}$
7. $c \leftarrow b \cdot (f^p)^2 \cdot f^{p^{\hat{}}2}$
8. $f' \leftarrow f^{p^{\hat{}}3} \cdot (c^6)^{\chi^{\hat{}}2} \cdot c \; b \cdot (f^p \cdot f)^9 \cdot a \cdot f^4$
9. Return f'

In the electronic calculator 10 that configures an authentication server, an authentication process is performed using the result of pairing computation obtained as described above.

In the present embodiment, the description has been made to the case of the embedding degree k=12. However, for example, in the case of an embedding degree k=10, similar computation can also be performed.

With the embedding degree k=10, pairing e is defined by using:

$$G_1 = E[r] \cap Ker(\phi_p - [1]),$$

and $$G_2 = E[r] \cap Ker(\phi_p - [p]),$$

as a nondegenerate bilinear map:

$$e: G_2 \times G_1 \to F^*_{p^{10}}/(F^*_{p^{10}})^r$$

where:

E is an additive group of rational points on a pairable elliptic curve defined over $F_{p^{10}}$ with an embedding degree of 10, and the curve equation is given by $y^2 = x^3 + ax + b$ where $a \in F_p$ and $b \in F_p$, $E[r]$ is a set of rational points of a prime order r, and $\phi_p$ is Frobenius endomorphism.

In this case, the order r and the trace t of the Frobenius endomorphism $\phi_p$ are represented as follows, using an integer variable $\chi$.

$$r(\chi) = 25\chi^4 + 25\chi^3 + 15\chi^2 + 5\chi + 1$$

$$t(\chi) = 10\chi^2 + 5\chi + 3$$

Furthermore, p-adic expansion by a characteristic p of the integer variable $\chi$ is represented as follows.

$$5\chi = p^4 + p^5 + p^7 + p^8 = p^4(1 + p + p^3 + p^4) \pmod{r(\chi)}$$

Then, a value $l_4$ of a rational point $S(x_s, y_s)$ on a line passing through rational points ($\chi Q$, $p\chi Q$) and a value $l_5$ of a rational point $S(x_s, y_s)$ on a line passing through rational points ($\chi Q+p\chi Q$, $p^3\chi Q+p^4\chi Q$) are computed, and then using a value $l_6$ of a rational point $S(x_s, y_s)$ on a line passing through rational points ($p^3\chi Q$, $p^4\chi Q$), a rational function $f'_{\chi,Q}(S)$ is computed by the following equation:

$$f'_{\chi,Q}(S) = \phi_p^4(f_{\chi,Q}(S)^{1+p+p^3+p^4} \cdot l_4 \cdot l_5 \cdot l_6).$$ [Formula 21]

Similarly to the case of the embedding degree k=12, also in the case of the embedding degree k=10, the authentication server performs pairing computation based on a flowchart shown in FIG. 4 by executing the pairing computation program.

With the pairing computation program, as shown in FIG. 4, in step T1, the CPU 11 of the electronic calculator 10 functions as input means for inputting required data. More specifically, in the electronic calculator 10, data of the integer variable $\chi$ and data of the rational point Q stored beforehand in the memory device 13 are input in a predetermined register provided inside the CPU 11, and in addition, data of the rational point S temporarily stored as signature data in the memory device 13 is input in a predetermined register provided inside the CPU 11.

Then, with the pairing computation program, the CPU 11 of the electronic calculator 10 functions as the first computation means for performing computation of a rational function $f_{\chi,Q}(S)$ by Miller's algorithm, in step T2.

It is noted that in this step T2, the first equation in step S22 in the flowchart shown in FIG. 3 is given as follows.

$$\lambda_{T,T} \leftarrow (3x_T^2 + a)/(2y_T) \qquad 1.$$

Here, "a" denotes the first-order coefficient in the elliptic curve given by $y^2 = x^3 + ax + b$ where $a \in F_p$ and $b \in F_p$. Except for this first equation, computation of the rational function $f_{\chi,Q}(S)$ is performed similarly to the flowchart shown in FIG. 3.

Furthermore, in step T2, the electronic calculator 10 also computes $\chi Q$ along with the rational function $f_{\chi,Q}(S)$ and stores the computation result in a predetermined register.

Then, with the pairing computation program, the CPU 11 of the electronic calculator 10 functions as the second computation means for computing rational points $p\chi Q$, $\chi Q+p\chi Q$, $p^3\chi Q+p^4\chi Q$ in step T3.

In particular, in the second computation means, letting $\chi Q$ stored in the predetermined register in step T2=R, using the relation of Frobenius endomorphism $\phi_p$ of R being $\phi_p(R)=pR$, computation is performed by assuming that the rational points are $p\chi Q=pR$, $\chi Q+p\chi Q=R+pR$, $p^3\chi Q+p^4\chi Q=p^3R+p^4R$.

Specifically, given $T=\chi Q=R$ where $X=pR$, $Y=R+pR$, $Z=p^3R+p^4R$, the electronic calculator 10 performs computation as follows:

$$X \leftarrow \phi_p(T),$$

$$Y \leftarrow +X, \text{ and}$$

$$Z \leftarrow \phi_p^3(Y).$$

Then, with the pairing computation program, the CPU 11 of the electronic calculator 10 functions as the third computation means for computing the value $l_4$ of the rational point $S(x_s, y_s)$ on the line passing through the rational points ($\chi Q$, $p\chi Q$) and the value $l_5$ of the rational point $S(x_s, y_s)$ on the line passing through the rational points ($\chi Q+p\chi Q$, $p^3\chi Q+p^4\chi Q$), in step T4.

Specifically, in the electronic calculator 10, $l_4 = l_{T,X}(S)$ is computed as follows:

$$\lambda_{T,X} \leftarrow (y_X - y_T)/(x_X - x_T),$$

$$l_{T,X}(S) \leftarrow (x_S - x_X)\lambda_{T,X} - (y_S - y_X).$$

Furthermore, in the electronic calculator 10, $l_5 = l_{Y,Z}(S)$ is computed as follows:

$$\lambda_{Y,Z} \leftarrow (y_Z - y_Y)/(x_Z - x_Y),$$

$$l_{T,Z}(S) \leftarrow (x_S - x_Z)\lambda_{Y,Z} - (y_S - y_Z).$$

Then, with the pairing computation program, the CPU 11 of the electronic calculator 10 functions as the fourth computation means for computing, using the computation result in the first computation means, the computation result in the third computation means, and the value $l_6$ of the rational point $S(x_s, y_s)$ on the line passing through rational points ($p^3\chi Q$, $p^4\chi Q$), a rational function $f'_{\chi,Q}(S)$ as follows, in step T5:

$$f'_{\chi,Q}(S) = \phi_p^4(f_{\chi,Q}(S)^{1+p+p^3+p^4} \cdot l_4 \cdot l_5 \cdot l_6).$$ [Formula 21]

In particular, in this case, using Frobenius endomorphism $\phi_p$ of the rational function $f_{\chi,Q}(S)$ being $\phi_p(f_{\chi,Q}(S)) = f_{\chi,Q}(S)^p$, the electronic calculator 10 computes:

$$f_{\chi,Q}(S)^{1+p} \cdot l_4.$$ [Formula 22]

Furthermore, using Frobenius endomorphism $\phi_p$ of the value 1 of the rational point $S(x_s, y_s)$ on the line passing through the rational points $(Q_1, Q_2)$, $Q_1, Q_2 \in G_2$, being a value of the rational point $S(x_s, y_s)$ on a line passing through the rational points $(pQ_1, pQ_2)$, the electronic calculator 10 computes a rational function $f'_{\chi,Q}(S)$ by computing:

$$f_{\chi,Q}(S)^{p^3+p^4} \cdot l_6$$ [Formula 24]

which satisfies:

$$f_{\chi,Q}(S)^{p^3+p^4} \cdot l_6 = \phi_p^3(f_{\chi,Q}(S)^{1+p} \cdot l_4).$$ [Formula 23]

Specifically, the electronic calculator 10 performs computation as follows. Here, $p^{\tilde{3}}$ represents $p^3$.

1. $C \leftarrow f^p$
2. $C \leftarrow C \cdot f$
3. $A \leftarrow C \cdot l_{T,X}(S)$
4. $B \leftarrow A^{p^{\tilde{3}}}$
5. return A, B Furthermore, the electronic calculator 10 performs computation as:

1. $f' \leftarrow A \cdot B \cdot l_{Y,Z}(S)$
2. $f' \leftarrow f'^{p^{\tilde{4}}}$ thereby computing:

$$f'_{\chi,Q}(S) = \phi_p^4(f_{\chi,Q}(S)^{1+p+p^3+p^4} \cdot l_4 \cdot l_5 \cdot l_6).$$ [Formula 21]

Then, with the pairing computation program, the CPU 11 of the electronic calculator 10 functions as the fifth computation means for performing final exponentiation in the pairing e(Q,S) in step T6.

In the electronic calculator 10 that configures an authentication server, an authentication process is performed using the result of pairing computation obtained as described above.

Furthermore, in the case of the embedding degree k=10, letting the rational function calculated according to Miller's algorithm be given by $f_{\chi^2,Q}(S)$ ($\chi^{\tilde{2}}$ represents $\chi^2$), pairing e(Q,S) can also be computed.

In this case, the order r and the trace t of the Frobenius endomorphism $\phi_p$ is represented as follows, using an integer variable $\chi$.

$$r(\chi) = \chi^8 - 1$$

$$t(\chi) = -\chi^6 + \chi^4 - \chi^2 + 2$$

Furthermore, p-adic expansion by a characteristic p of the integer variable $\chi$ is represented as follows.

$$p\chi^2 = -p \pmod{r(\chi)}$$

Then, the electronic calculator 10 computes a rational function $f'_{\chi,Q}(S)$ by the following equation:

$$f'_{\chi,Q}(S) = f_{\chi^2,Q}(S)^p \qquad \text{[Formula 25]}$$

Therefore, according to the pairing computation program, in the electronic calculator 10, the pairing e(Q,S) can be computed as:

$$e(Q,S) = f'_{\chi,Q}(S)^{(p^{10}-1)/r}. \qquad \text{[Formula 26]}$$

With the embedding degree k=8, pairing e is defined by using:

$$G_1 = E[r] \cap Ker(\phi_p - [1]),$$

and $$G_2 = E[r] \cap Ker(\phi_p - [p]),$$

as a nondegenerate bilinear map:

$$e: G_2 \times G_1 \to F^{*8}_p / (F^{*8}_p)^r$$

where:
E is an additive group of rational points on a pairable elliptic curve defined over $F_p^8$, and the curve equation is given by $y^2 = x^3 + ax$ where $a \in F_p$, E[r] is a set of rational points of a prime order r, and $\phi_p$ is the Frobenius endomorphism.

In this case, the order r and the trace t of Frobenius endomorphism $\phi_p$ are represented as follows, using an integer variable $\chi$.

$$r(\chi) = 9\chi^4 + 12\chi^3 + 8\chi^2 + 4\chi + 1$$

$$t(\chi) = -9\chi^3 - 3\chi^2 - 2\chi$$

Furthermore, p-adic expansion by a characteristic p of the integer variable $\chi$ is represented as follows.

$$3\chi = -1 - p^2 + p^3 \pmod{r(\chi)}$$

Then, using a value $l_7$ of a rational point $S(x_s, y_s)$ on a line passing through rational points $(\chi Q, \chi Q)$, a value $l_8$ of a rational point $S(x_s, y_s)$ on a line passing through rational points $(2\chi Q, \chi Q)$, a value $l_9$ of a rational point $S(x_s, y_s)$ on a line passing through rational points $(p^2 Q, (3\chi+1)Q)$, and a value $l_{10}$ of a rational point $S(x_s, y_s)$ on a line passing through rational points $(3\chi Q, Q)$, the electronic calculator 10 computes a rational function $f'_{\chi,Q}(S)$ using the following equation:

$$f'_{\chi,Q}(S) = f_{\chi,Q}(S)^3 \cdot l_7 \cdot l_8 \cdot l_9 \cdot l_{10}. \qquad \text{[Formula 27]}$$

In other words, with the pairing computation program, the electronic calculator 10 performs computation of the rational function $f_{\chi,Q}(S)$ by Miller's algorithm as described above, computes $\chi Q$ along with the rational function $f_{\chi,Q}(S)$, and then stores the computation result in a predetermined register.

Then, letting $\chi Q$ stored in a predetermined register=R, using the relation of Frobenius endomorphism $\phi_p$ of R being $\phi_p(R) = pR$, the electronic calculator 10 computes rational points $2\chi Q, p^2\chi, 3\chi Q, (3\chi+1)Q$, computes the values $l_7, l_8, l_9, l_{10}$ using the computation result, and computes the rational function $f'_{\chi,Q}(S)$.

Then, in the electronic calculator 10, the pairing e(Q,S) can be computed as:

$$e(Q,S) = f'_{\chi,Q}(S)^{(p^8-1)/r}. \qquad \text{[Formula 28]}$$

It is noted that, in the case of the embedding degree k=8, the order r and the trace t of the Frobenius endomorphism $\phi_p$ may also be represented as follows, using the integer variable $\chi$.

$$r(\chi) = \chi^4 - 8\chi^2 + 25$$

$$t(\chi) = (2\chi^3 - 11\chi + 15)/15$$

In this case, p-adic expansion by the characteristic p of the integer variable $\chi$ is represented as follows.

$$\chi = -p + 2p^3 \pmod{r(\chi)}$$

In this case, using a value $l_{11}$ of a rational point $S(x_s, y_s)$ on a line passing through rational points $(pQ, \chi Q)$, the rational function $f'_{\chi,Q}(S)$ can also be computed by the following equation:

$$f'_{\chi,Q}(S) = f_{\chi,Q}(S) \cdot l_{11}. \qquad \text{[Formula 29]}$$

Alternatively, in the case of the embedding degree k=8, letting the rational functions calculated according to Miller's algorithm be given by $f_{\chi^2,Q}(S)$ ($\chi^2$ represents $\chi^2$) and $f_{\chi,Q}(S)$, the pairing e(Q,S) can also be computed.

Here, the order r and the trace t of the Frobenius endomorphism $\phi_p$ can also be represented as follows, using the integer variable $\chi$.

$$r(\chi) = \chi^8 - \chi^4 + 1$$

$$t(\chi) = \chi^5 - \chi + 1$$

In this case, p-adic expansion by the characteristic p of the integer variable $\chi$ is represented as follows.

$$p\chi + \chi^2 = -o^2 \pmod{r(\chi)}$$

In this case, using a value $l_{12}$ of a rational point $S(x_s, y_s)$ on a line passing through rational points $(\chi^2 Q, p\chi Q)$, the rational function $f'_{\chi,Q}(S)$ can be computed by the following equation:

$$f'_{\chi,Q}(S) = f_{\chi^2,Q}(S) \cdot f_{\chi,Q}(S)^p \cdot l_{12}. \qquad \text{[Formula 30]}$$

Here, the electronic computation device 10 computes $\chi Q$, along with the computation of the rational function $f_{\chi^2,Q}(S)$ and the rational function $f_{\chi,Q}(S)$ by Miller's algorithm as described above, and stores the computation result in a predetermined register.

Then, letting $\chi Q$ stored in a predetermined register=R, using the relation of Frobenius endomorphism $\phi_p$ of R being $\phi_p(R) = pR$, the electronic calculator 10 computes a rational point $p\chi Q$, and computes the above-noted value $l_{12}$ using this computation result, and computes the rational function $f'_{\chi,Q}(S)$. Then, the pairing e(Q,S) can be computed as:

$$e(Q,S) = f'_{\chi,Q}(S)^{(p^8-1)/r}. \qquad \text{[Formula 28]}$$

With the embedding degree k=18, pairing e is defined by using:

$$G_1 = E[r] \cap Ker(\phi_p - [1]),$$

and $$G_2 = E[r] \cap Ker(\phi_p - [p]),$$

as a nondegenerate bilinear map:

$$e: G_2 \times G_1 \leftarrow F^{*18}_p / (F^{*18}_p)^r$$

where:
E is an additive group of rational points on a pairable elliptic curve defined over $F_p^{18}$, and the curve equation is given by $y^2 = x^3 + b$ where $b \in F_p$, E[r] is a set of rational points of a prime order r, and $\phi_p$ is Frobenius endomorphism.

In this case, the order r and the trace t of the Frobenius endomorphism $\phi_p$ are represented as follows, using an integer variable $\chi$.

$$r(\chi) = (\chi^6 + 37\chi^3 + 343)/343$$

$$t(\chi) = (\chi^4 + 16\chi + 7)/7$$

In this case, p-adic expansion by a characteristic p of the integer variable $\chi$ is represented as follows.

$$\chi = -3p + p^4 \pmod{r(\chi)}$$

Then, a value $l_{13}$ of a rational point $S(x_s, y_s)$ on a line passing through rational points $(3pQ, \chi Q)$, the electronic calculator 10 computes a rational function $f'_{\chi,Q}(S)$ by the following equation:

$$f'_{\chi,Q}(S) = f_{\chi,Q}(S) \cdot l_{13}. \qquad \text{[Formula 31]}$$

In other words, with the pairing computation program, the electronic calculator 10 performs computation of the rational function $f_{\chi,Q}(S)$ by Miller's algorithm as described above, computes $\chi Q$ together with the rational function $f_{\chi,Q}(S)$, and then stores the computation result in a predetermined register.

Then, the electronic calculator 10 computes the above-noted value $l_{13}$ using the rational function $f_{\chi,Q}(S)$ and the computation result of $\chi Q$, and computes the rational function $f'_{\chi,Q}(S)$. Then, the pairing $e(Q,S)$ can be computed as:

$$e(Q,S) = f'_{\chi,Q}(S)^{(p^{18}-1)/r}. \qquad \text{[Formula 32]}$$

As described above, pairing computation is performed with Xate pairing to achieve faster pairing computation, thereby making group signatures using pairing computation into practical use.

INDUSTRIAL APPLICABILITY

In accordance with the present invention, it is possible to provide a high-speed pairing computation device and to provide digital group signature service of practical use.

The invention claimed is:

1. A pairing computation device for defining pairing e by using:

$$G_1 = E[r] \cap \mathrm{Ker}(\phi_p - [1]), \text{ and}$$

$$G_2 = E[r] \cap \mathrm{Ker}(\phi_p - [p]),$$

as a nondegenerate bilinear map:

$$e: G_2 \times G_1 \to F^*_{p^k}/(F^*_{p^k})^r,$$

where:
E is an additive group of rational points on a pairable elliptic curve defined over $F_{p^k}$ with an embedding degree of k, and the curve equation is given by $y^2 = x^3 + ax + b$ where $a \in F_p$ and $b \in F_p$,
E[r] is a set of rational points of a prime order r, and and $\phi_p$ is Frobenius endomorphism,
computing pairing $e(Q,S)$ where $S \in G_1$ and $Q \in G_2$, and outputting a result of the computation,
the pairing computation device comprising, where t is a trace of the Frobenius endomorphism $\phi_p$, instead of computing the pairing $e(Q,S)$ by using a rational function $f_{t-1,Q}(S)$ calculated according to Miller's algorithm as:

$$e(Q,S) = f_{t-1,Q}(S)^{(p^k-1)/r}, \text{ and}$$

the order r and the trace t of the Frobenius endomorphism $\phi_p$ are used as functions of an integer variable $\chi$:
a computation processor coupled to a memory and configured to
compute a rational function $f_{\chi,Q}(S)$;
compute a value of a rational point $S(x_s, y_s)$ on a line passing through a predetermined rational point;
compute a rational function $f'_{\chi,Q}(S)$ using computation results of the rational function $f_{\chi,Q}(S)$ and the value of the rational point $S(x_s, y_s)$; and perform pairing computation by using the rational function $f'_{\chi,Q}(S)$ as:

$$e(Q,S) = f'_{\chi,Q}(S)^{(p^k-1)/r},$$

the pairing computation being used in authentication of a digital group signature.

2. The pairing computation device according to claim 1, wherein the computation processor further computes $\chi Q$, stores a result of the computation in a predetermined register, and computes the predetermined rational point by using the result of the computation of $\chi Q$.

3. The pairing computation device according to claim 2, wherein, if the embedding degree k=12,
using the integer variable $\chi$, letting the order r and the trace t of the Frobenius endomorphism $\phi_p$ be:

$$r(\chi) = 36\chi^4 - 36\chi^3 + 18\chi^2 - 6\chi + 1,$$

$$t(\chi) = 6\chi^2 + 1,$$

letting $\chi Q = R$, using a relation of Frobenius endomorphism $\phi_p$ of R being $\phi_p(R) = pR$, rational points $p^{10}\chi Q$, $\chi Q + p^{10}\chi Q$, $p\chi Q + p^3 \chi Q$ are computed,
a value $l_1$ of the rational point $S(x_s, y_s)$ on a line passing through rational points $(\chi Q, p^{10}\chi Q)$ and a value $l_2$ of the rational point $S(x_s, y_s)$ on a line passing through rational points $(\chi Q + p^{10}\chi Q, p\chi Q + p^3 \chi Q)$ are computed, and
the rational function $f'_{\chi,Q}(S)$ is computed by using a value $l_3$ of the rational point $S(x_s, y_s)$ on a line passing through rational points $(p\chi Q, p^3 \chi Q)$ as:

$$f'_{\chi,Q}(S) = f_{\chi,Q}(S)^{1+p^3+p^{10}} \cdot l_1 \cdot l_2 \cdot l_3.$$

4. The pairing computation device according to claim 3, wherein
using Frobenius endomorphism $\phi_p$ of the rational function $f_{\chi,Q}(S)$ being $\phi_p(f_{\chi,Q}(S)) = f_{\chi,Q(S)}^P$, $$\theta_{\chi,Q}(S)^{1+p^{10}} \cdot l_1$$

is computed, and
using Frobenius endomorphism $\phi_p$ of a value 1 of the rational point $S(x_s, y_s)$ on a line passing through rational points $(Q_1, Q_2)$, $Q_1, Q_2 \in G_2$, being a value of the rational point $S(x_s, y_s)$ on a line passing through rational points $(pQ_1, pQ_2)$, the rational function $f'_{\chi,Q}(S)$ is computed by computing:

$$f_{\chi,Q}(S)^{p+p^3} \cdot l_3$$

which satisfies:

$$f_{\chi,Q}(S)^{p+p^3} \cdot l_3 = \phi_p^{3}(f_{\chi,Q}(S)^{1+p^{10}} \cdot l_1).$$

5. A pairing computation method for an electronic computation device that includes a central processing unit (CPU), the pairing computation method being used in authentication of a digital group signature, the pairing computation method defining pairing e by using:

$$G_1 = E[r] \cap \mathrm{Ker}(\phi_p - [1]), \text{ and}$$

$$G_2 = E[r] \cap \mathrm{Ker}(\phi_p - [p]),$$

as a nondegenerate bilinear map:

$$e: G_2 \times G_1 \to F^*_{p^k}/(F^*_{p^k})^r,$$

where:
E is an additive group of rational points on a pairable elliptic curve defined over $F_{p^k}$ with an embedding degree of k, and the curve equation is given by $y^2 = x^3 + ax + b$ where $a \in F_p$ and $b \in F_p$,
E[r] is a set of rational points of a prime order r, and $\phi_p$ is Frobenius endomorphism, and computing pairing e(Q,S) where S∈$G_1$ and Q∈$G_2$ by the electronic computation device including the CPU, the pairing computation method comprising steps of, where t is a trace of the Frobenius endomorphism $\phi_p$, instead of computing the pairing e(Q,S) by using a rational function $f_{t-1,Q}(S)$ calculated according to Miller's algorithm as:

$$e(Q,S) = f_{t-1,Q}(S)^{(p^k-1)/r}, \text{ and}$$

the order r and the trace t of the Frobenius endomorphism $\phi_p$ are used as functions of an integer variable $\chi$:

computing, using the CPU of the electronic computation device, a rational function $f_{\chi,Q}(S)$;

computing, using the CPU of the electronic computation device, a value of a rational point $S(x_s, y_s)$ on a line passing through a predetermined rational point;

computing, using the CPU of the electronic computation device, a rational function $f'_{\chi,Q}(S)$ using results of the computations of the rational function $f_{\chi,Q}(S)$ and the value of the rational point $S(x_s, y_s)$; and performing, using the CPU of the electronic computation device, pairing computation by using the rational function $f'_{\chi,Q}(S)$ as:

$$e(Q,S) = f'_{\chi,Q}(S)^{(p^k-1)/r},$$

the pairing computation being used in the authentication of the digital group signature.

6. The pairing computation method according to claim 5, further comprising computing, using the CPU of the electronic computation device, $\chi Q$ and computing the predetermined rational point by using the result of the computation of $\chi Q$, after the step of computing the rational function $f_{\chi,Q}(S)$.

7. A non-transitory computer-readable storage medium including computer executable instructions, wherein the instructions, when executed by a computer, cause the computer to perform a pairing computation method used in authentication of a digital group signature, the pairing computation method defining pairing e by using:

$$G_1 = E[r] \cap Ker(\phi_p - [1])), \text{ and}$$

$$G_2 = E[r] \cap Ker(\phi_p - [p]),$$

as a nondegenerate bilinear map:

$$e: G_2 \times G_1 \to F^{*k}_p / (F^{*k}_p)^r,$$

where:

E is an additive group of rational points on a pairable elliptic curve defined over $F_p^k$ with an embedding degree of k, and the curve equation is given by $y^2 = x^3 + ax + b$ where a∈$F_p$ and b∈$F_p$, E[r] is a set of rational points of a prime order r, and $\phi_p$ is Frobenius endomorphism, and computing pairing e(Q,S) where S∈$G_1$ and Q∈$G_2$, the pairing computation method comprising, where t is a trace of the Frobenius endomorphism $\phi_p$, instead of causing computation of the pairing e(Q,S) by using a rational function $f_{t-1,Q}(S)$ calculated according to Miller's algorithm as:

$$e(Q,S) = f_{t-1,Q}(S)^{(p^k-1)/r}, \text{ and}$$

the order r and the trace t of the Frobenius endomorphism $\phi_p$ are used as functions of an integer variable $\chi$:

computing a rational function $f_{\chi,Q}(S)$;

computing a value of a rational point $S(x_s, y_s)$ on a line passing through a predetermined rational point;

computing a rational function $f'_{\chi,Q}(S)$ using results of the computations of the rational function $f_{\chi,Q}(S)$ and the value of the rational point $S(x_s, y_s)$; and performing pairing computation by using the rational function $f'_{\chi,Q}(S)$ as:

$$e(Q,S) = f'_{\chi,Q}(S)^{(p^k-1)/r},$$

the pairing computation being used in the authentication of the digital group signature.

8. The non-transitory computer-readable storage medium according to claim 7, further comprising:

computing $\chi Q$; and computing the predetermined rational point by using the result of the computation of $\chi Q$.

* * * * *